UNITED STATES PATENT OFFICE.

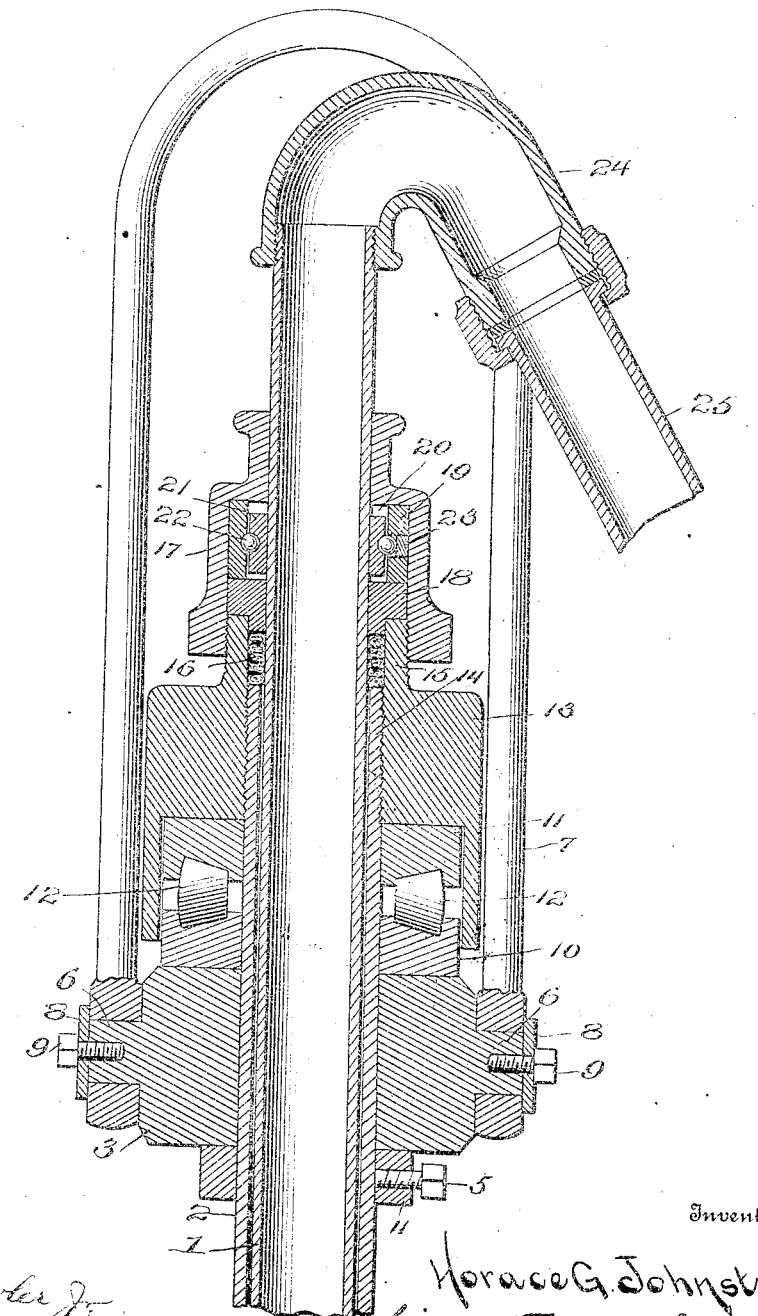

HORACE G. JOHNSTON, OF CORSICANA, TEXAS.

HYDRAULIC SWIVEL.

No. 929,953.

Specification of Letters Patent.

Patented Aug. 3, 1909.

Application filed September 28, 1908. Serial No. 455,004.

*To all whom it may concern:*

Be it known that I, HORACE G. JOHNSTON, a citizen of the United States, residing at Corsicana, in the county of Navarro and State of Texas, have invented certain new and useful Improvements in Hydraulic Swivels; and I do hereby declare the following to be a full, clear, and exact description of the invention, such as will enable others skilled in the art to which it appertains to make and use the same.

This invention relates to hydraulic swivels, and especially to that class of swivels disclosed in Patents Nos. 742,607, 873,669, and Reissue 12,732, and has for an object to provide a swivel of the class embodying improved packing means and improved associate swiveling means.

With this and other objects in view, the invention comprises certain novel constructions, combinations and arrangements of parts, as will be hereinafter fully described and claimed.

The drawing is a vertical, longitudinal, sectional view of the improved swivel wherein the hose stem is designated as 1 and the swivel stem as 2. Upon the swivel stem, a collar 3 is secured in any approved manner as by the collar 4 and set screw 5, the collar 3 being provided with trunnions 6 upon which are pivoted a bail 7 secured in position by means of washers 8 and screws 9.

Upon the collar 3 an annular race way 10 is disposed and a similar race way 11 spaced therefrom both embracing the swivel stem 2 and between which are disposed rollers 12 preferably conical and formed as shown. Upon the annular race way 11 a member 13 is seated engaging the swivel stem in any approved manner as by means of the screw threads 14. The member 13 is provided with an upstanding annular boss 15 substantially similar in diameter to the interior screw-threaded portion engaging upon the screw threads of the swivel stem, thereby producing an annular space between the upstanding boss and the hose stem 1, within which a packing, shown conventionally at 16, is employed. Upon the boss 15 a cap 17 is employed having internal screw threads engaging the screw threads of the boss. Within the cap a follower 18 is employed having an annular shoulder adapted to be inserted between the boss 15 and the hose stem 1 and to bear upon the packing 16 so that when such follower is clamped in position, it forms a gland through which the hose stem is inserted and in which it may rotate.

For exerting pressure upon the follower 18 a race way 19 is provided substantially filling the interval between the upper part of the follower 18 and a shoulder 20 within the cap 17. The race way 19 is provided with a ball race internally and a coacting race way 21 is shrunk upon the hose stem 1 and between such race ways 19 and 21 a plurality of balls 22 are employed. The balls 22 are inserted within the ball race by means of a screw plug 23 removable from the race way 19 to permit the insertion of balls therein after which the plug is reseated retaining the balls in position.

The hose stem 1 is, of course, provided with the usual goose neck 24 to which the hose 25 is attached in the usual well known manner.

The use of hydraulic swivels being so well known in the art and the construction of the device being so clearly shown in the drawing, it is believed that the use and operation thereof will be clearly understood without a description thereof.

What I claim is:—

1. In a swivel, a swivel stem, a hose stem disposed rotatably within the swivel stem, a member rigidly secured to the swivel stem and provided with an upstanding annular boss spaced from the hose stem, a cap adapted to be disposed about the annular boss, a follower disposed within the cap and having an annular member proportioned to be inserted within the space between the boss and the hose stem, a ball race member disposed within the cap and adapted to exert pressure upon the follower, a ball race member rigidly embracing the hose stem and balls disposed between the race members.

2. In a swivel, a swivel stem, a hose stem inserted within the swivel stem, a member embracing the swivel stem and having upstanding means forming a stuffing box between the hose stem and the embracing member, a cap secured upon the embracing member and providing a recess between such cap and the hose stem, a ball race carried by the hose stem, a co-acting ball race carried by the cap, and balls seated within the co-acting races.

3. In a swivel, a swivel stem, a hose stem inserted within the swivel stem, a member embracing the swivel stem and provided with an annular boss extending beyond the end of the swivel stem and forming a recess between such boss and the hose stem, a follower embracing the hose stem and provided with means for exerting pressure upon the packing, a cap engaged upon the boss, a ball race carried within the cap and embracing the hose stem and proportioned to exert pressure upon the follower, a ball race embracing the hose stem within the first-mentioned ball race, and balls interposed between the ball races.

4. In a swivel, a swivel stem, a hose stem inserted within the swivel stem, a member embracing the swivel stem and provided with an annular screw-threaded boss extending beyond the end of the swivel stem and forming an annular recess between the boss and the hose stem, a packing disposed within the annular recess, a follower provided with an annular ring embracing the hose stem and bearing upon the packing, a cap covering the follower and engaging the screw threads of the embracing member, a ball race member disposed within the cap and adapted to exert pressure upon the follower, a ball race member disposed within the first-mentioned ball-race member and provided with a ball race registering with the race of the first-mentioned ball race member, means permitting the insertion of balls through one member into the race, and balls disposed within the race.

5. In a swivel, a swivel stem, a member secured rigidly to the swivel stem and having an upstanding boss, a cap engaging the upstanding boss, a follower within the cap having an annular ring, a ball race member rigidly carried by the cap for engaging the follower, a hose stem inserted through the cap, the follower and into the swivel stem, and a ball race member rigidly secured to the swivel stem and disposed in opposition to the first-mentioned ball race member.

In testimony whereof I affix my signature in presence of two witnesses.

HORACE G. JOHNSTON.

Witnesses:
W. J. HALL,
M. WESTMORELAND.